Aug. 14, 1956  F. A. SCHUMACHER  2,758,446
TWO CONTROL TWO-TEMPERATURE REFRIGERATING SYSTEM
Filed Jan. 5, 1953
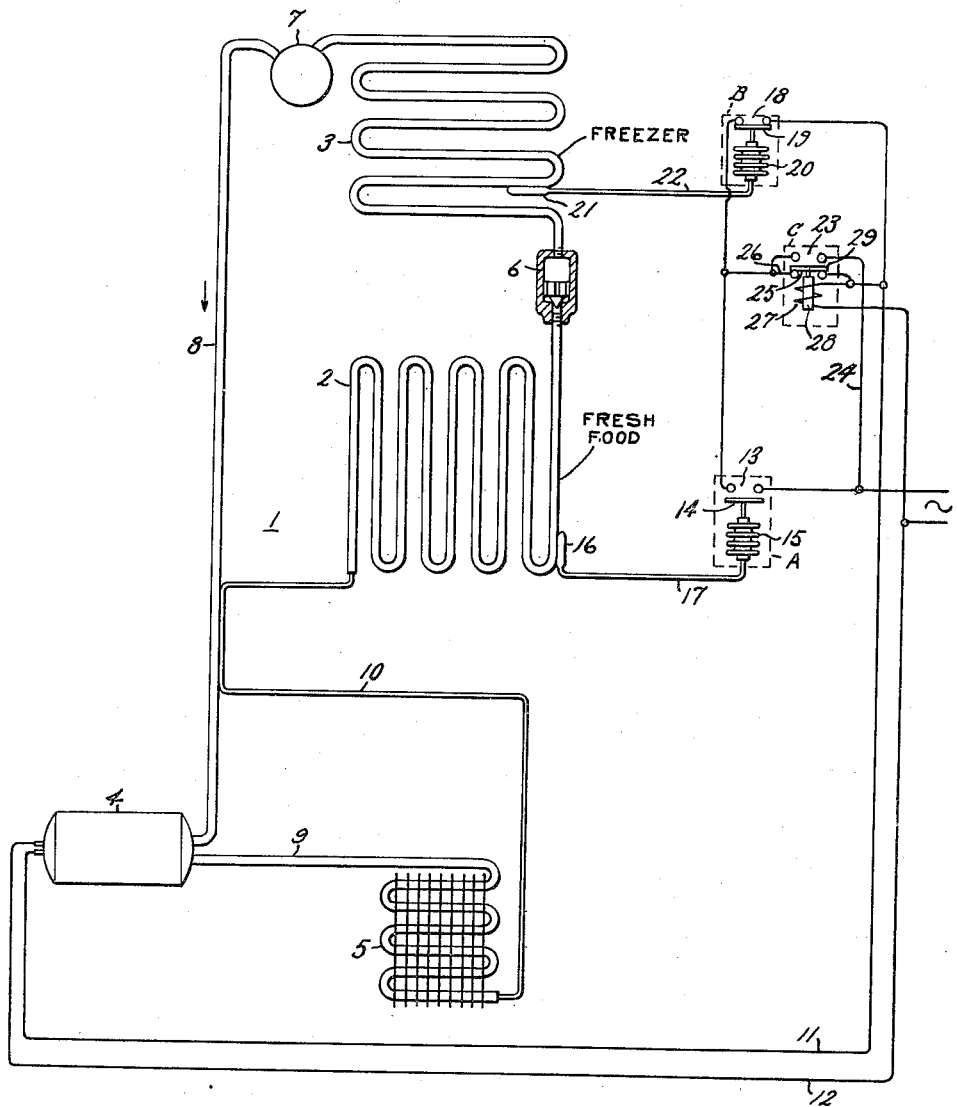
Inventor:
Frank A. Schumacher,
by *Sheridan le Bujo*
His Attorney.

2,758,446
Patented Aug. 14, 1956

2,758,446
TWO CONTROL TWO-TEMPERATURE REFRIGERATING SYSTEM

Frank A. Schumacher, Erie, Pa., assignor to General Electric Company, a corporation of New York Application January 5, 1953, Serial No. 329,688

2 Claims. (Cl. 62—4)

My invention relates to a two-temperature refrigerating system and pertains more particularly to means for controlling a series two-temperature refrigerating system.

The pimary object of my invention is to provide in a series two-temperature refrigerating system controlling means adapted both for providing cycling defrosting of the fresh food evaporator and for maintaining satisfactory fresh food and freezer evaporator temperatures.

Further objects and advantages of my invention will become apparent as the following description proceeds and the features of novelty which characterize my invention will be pointed out with particularity in the claims annexed to and forming part of this specification.

In carrying out the objects of my invention, I provide a refrigerating system including a fresh food evaporator and a freezer evaporator connected in series and means for maintaining a pressure differential therebetween. I control the operation of this system with two temperature responsive controls; a first control responsive to the temperature of the fresh food evaporator and a second control responsive to the temperature of the freezer evaporator. The first control energizes a refrigerating unit in the system and thereby initiates the refrigeration cycle when the fresh food evaporator attains a predetermined high temperature at which temperature the melting of all frost on the evaporator is insured. A holding circuit maintains the refrigerating unit energized until the freezer evaporator attains a predetermined low temperature, at which time the second control terminates the cycle and conditions the system for initiation of the succeeding cycle when the fresh food evaporator again attains its predetermined high temperature.

For a better understanding of my invention, reference may be had to the accompanying drawing the single figure of which illustrates a preferred embodiment of my invention.

Referring to the drawing, there is shown a series two-temperature refrigerating system generally designated 1. The refrigerating system 1 includes a fresh food evaporator 2, a freezer evaporator 3, a refrigerating unit 4 including a motor (not shown) and a condenser 5. The fresh food evaporator 2 and the freezer evaporator 3 are connected in series and provided therebetween is means, such as a weighted valve 6, for maintaining a pressure differential between the evaporators. When the pressure of refrigerant in the fresh food evaporator 2 exceeds a predetermined differential above the freezer pressure, the valve 6 permits refrigerant to flow freely from the fresh food evaporator into the freezer evaporator. From the freezer evaporator 3 refrigerant is conducted into a header 7. Through a suction line 8, the refrigerating unit 4 exhausts vaporous refrigerant from the header 7. Through a conduit 9 the refrigerating unit 4 delivers compressed vaporous refrigerant to the condenser 5, in which it is liquefied. From the condenser 5 liquid refrigerant is conducted to the fresh food evaporator 2 through a capillary tube 10, a portion of which is placed in heat exchange relationship with the suction line 8.

Connected to the motor (not shown) in the refrigerating unit 4 is a current supply circuit including supply lines 11 and 12. Connected in the supply circuit is means for controlling the refrigerating unit comprising a first control A responsive to the temperature of the fresh food evaporator 2 and a second control B responsive to the temperature of the freezer evaporator 3. Both the first, or fresh food evaporator control A, and the second, or freezer evaporator control B, are connected in series in the supply line 11.

The first control A comprises a pair of contacts 13, a contact member 14, a bellows 15, a volatile fluid containing bulb 16 placed in heat exchange relationship with the fresh food evaporator 2 and a conduit 17 connecting the bulb with the bellows. At a predetermined high temperature of the fresh food evaporator 2, the volatile fluid in the bulb 16 is effective for expanding the bellows 15 to actuate the contact member 14 for closing the contacts 13. At a predetermined low temperature the bellows 15 contracts and the contacts 13 are thereby opened.

The second control B comprises a pair of contacts 18, a contact member 19, a bellows 20, a volatile fluid containing bulb 21 and a conduit 22 connecting the bulb with the bellows. The second control B is similar to the first control A in that the bellows 20 expands and actuates the contact member 19 for closing the contacts 18 at a predetermined high temperature and contracts to open the contacts 18 at a predetermined low temperature.

The first control A is adapted for operating at a predetermined temperature range, closing the contacts 13 therein when the fresh food evaporator 2 attains a high temperature of 37° F. and opening the contacts 13 when the temperature of the fresh food evaporator decreases to 32° F. The second control B is adapted for operating at a predetermined temperature range lower than that of the first control A, closing the contacts 18 therein when the temperature of the freezer evaporator 13 stands at —5° F. or above and opening the contacts 18 when the freezer evaporator attains a low temperature of —10° F. These predetermined temperature ranges are such as to insure that the contacts 18 in the control B will still be closed when the contacts 13 in the control A first open. It is to be understood, of course, that the controls A and B could be adjustable for varying these predetermined temperature ranges.

Also included in the means for controlling the refrigerating system 1 is a relay generally designated C. The relay C controls a first pair of contacts 23 in a first circuit designated 24 across the first control A. The relay C further controls a second pair of contacts 25 and a second circuit designated 26 across the second control B. The coil of the relay C indicated by 27 is connected across the current supply lines to the motor 11 and 12. Provided in the relay C for operating in the coil 27 is a magnetic plunger 28 carrying a contact member 29. When the relay C is deenergized, the plunger 28 is in the lowered position thereof shown in the drawing and the contact member 29 opens the contacts 23 in the first circuit 24 across the control A and closes the contacts 25 in the second circuit 26 across the second control B. When the relay C is energized, the plunger 28 is lifted by the coil 27 and the contact member 29 closes the contacts 23 and opens the contacts 25.

When the refrigerating unit 4 is idle, the contacts 13 in the first control A are open. The contacts 18 in the second control B may be either open or closed, depending upon whether or not the temperature of the freezer evaporator 3 has risen to —5° F. or above. The relay C is de-energized and the contacts 25 in the second circuit 26 across the second control B are closed. Subsequently, when the fresh food evaporator 2 attains a temperature of 37° F., at which temperature all of the frost on the fresh food evaporator is melted, the contacts 13 of the first control A are closed. Additionally, when the fresh food evaporator attains a temperature of 37°, the freezer evaporator 3 will have attained a temperature of —5° F. or above and the contacts 18 in the control B will have closed. Thus, a circuit is completed through the first control A, the second control B and the refrigerating unit 4 for energizing the refrigerating unit to supply refrigerant to the evaporators. This also completes the circuit 26 through the relay C which energizes the relay whereby the contacts 23 are closed and the contacts 25 are opened. When the temperature of the fresh food evaporator 2 decreases to 32° F., as a result of the energization of the refrigerating unit 4, the contacts 13 in the first control A open. The temperature of the freezer evaporator 3, however, will still be above —10° F. and, therefore, the contacts 18 in the second control B will still be closed thereby maintaining the relay C energized and maintaining a supply circuit through the refrigerating unit 4. In this manner, my controlling means insures that the refrigerating unit 4 is maintained energized during each refrigeration cycle until the freezer evaporator 3 is satisfied as to temperature, or in other words, until the temperature of the freezer evaporator is lowered to —10° F. Subsequently, when the freezer evaporator 3 does attain its low temperature of —10° F., the contacts 18 are opened. This breaks the supply circuit and de-energizes both the refrigerating unit 4 and the relay C for terminating the refrigeration cycle. With the relay C de-energized, the contacts 23 therein are open and the contacts 25 are closed whereby the controlling means is conditioned for energizing the refrigerating unit 4 and supplying refrigerant to the evaporators when the fresh food evaporator 2 again attains its high temperature of 37° F.

As pointed out above, all the frost on the fresh food evaporator 2 is melted by the time the fresh food evaporator attains its high temperature of 37° F. and before the unit is again energized for supplying refrigerant to the evaporators. Therefore, it will be seen that in my system the fresh food evaporator 2 is defrosted after each cycle of operation. It will be seen further that after the first control A initiates the refrigeration cycle by energizing the refrigerating unit 4, the refrigerating unit will be maintained energized by the relay even after the fresh food evaporator has attained its low temperature of 32° F. When the freezer evaporator 3 subsequently attains its low temperature of —10° F., the second control B will be effective for breaking the supply circuit to de-energize the refrigerating unit 4 and thereby both terminate the cycle and to condition the controlling means for restarting the refrigerating unit when the fresh food evaporator again attains its high temperature of 37° F., at which temperature the fresh food evaporator 2 will again be fully defrosted.

While I have shown and described a specific embodiment of my invention, I do not desire my invention to be limited to the particular form shown and described and I intend by the appended claims to cover all modifications within the spirit and scope of my invention.

What I claim as new and desire to secure by Letters Patent of the United States is:

1. A two-temperature refrigerating system comprising a fresh food evaporator and a freezer evaporator connected in series, means for maintaining a predetermined pressure differential between said evaporators, a refrigerating unit for supplying refrigerant initially to said fresh food evaporator, a supply circuit to said refrigerating unit, a first control connected in series in said supply circuit, said first control being responsive to temperature of said fresh food evaporator, a second control connected in series in said supply circuit, said second control being responsive to temperature of said freezer evaporator, each of said controls being movable between open and closed positions, said second control being movable to its closed position prior to said first control being movable to its closed position, said first control being movable to its closed position when said fresh food evaporator attains a predetermined high temperature at which all frost thereon is melted for completing said supply circuit and thereby energizing said refrigerating unit, and a relay effective for maintaining said supply circuit completed after the temperature of said fresh food evaporator decreases below said predetermined high temperature thereof and said first control moves to open position, said second control being movable to its open position to break said supply circuit when said freezer evaporator subsequently attains a predetermined low temperature.

2. A two-temperature refrigerating system comprising a fresh food evaporator and a freezer evaporator connected in series, means for maintaining a predetermined pressure differential between said evaporators, a refrigerating unit for supplying refrigerant initially to said fresh food evaporator, a supply circuit to said refrigerating unit, a first control connected in series in said supply circuit, said first control being adapted to operate at a predetermined temperature range, said first control being responsive to temperature of said fresh food evaporator, a second control connected in series in said supply circuit, said second contol being adapted to operate at a predetermined temperature range lower than that of said first control, said second control being responsive to temperatures of said freezer evaporator, and a relay connected across said supply circuit, said relay controlling a first circuit across said first control, said relay further controlling a second circuit across said second control, said relay opening said first circuit and closing said second circuit thereof when deenergized and closing said first circuit and opening said second circuit thereof when energized, said first control being effective for completing said supply circuit and thereby energizing said refrigerating unit when said fresh food evaporator attains the high temperatures of said predetermined temperature range of said first control at which all frost on said fresh food evaporator is melted, said relay being energized when said supply circuit is completed by said first control, said relay being maintained energized by said second control when said first control becomes ineffective, said second control subsequently being effective for breaking said supply circuit and deenergizing said relay when the temperature of said freezer evaporator subsequently decreases to the low temperature of said predetermined temperature range of said second control thereby to deenergize said refrigerating unit and condition said system for restarting when said fresh food evaporator again attains said predetermined high temperature.

References Cited in the file of this patent
UNITED STATES PATENTS

| | | |
|---|---|---|
| 2,065,604 | Miller | Dec. 29, 1936 |
| 2,095,011 | Philipp | Oct. 5, 1937 |
| 2,133,966 | Buchanan | Oct. 25, 1938 |
| 2,192,847 | Buchanan | Mar. 5, 1940 |